United States Patent
Suarez et al.

(10) Patent No.: US 10,481,871 B2
(45) Date of Patent: *Nov. 19, 2019

(54) SEMICONDUCTOR-JUNCTION-DERIVED RANDOM NUMBER GENERATION WITH TRIGGERING MECHANISM

(71) Applicant: The Government of the United States, as represented by the Secretary of the Army, Washington, DC (US)

(72) Inventors: John Suarez, Brooklyn, NY (US); Moses Mingle, Forest Hill, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/387,745

(22) Filed: Dec. 22, 2016

(65) Prior Publication Data

US 2019/0205097 A1 Jul. 4, 2019

Related U.S. Application Data

(63) Continuation of application No. 14/514,421, filed on Oct. 15, 2014, now Pat. No. 9,547,476.

(51) Int. Cl.
*G06F 7/58* (2006.01)
(52) U.S. Cl.
CPC .................. *G06F 7/588* (2013.01)
(58) Field of Classification Search
CPC ...................................... G06F 5/588
USPC ...................................... 708/3, 255
See application file for complete search history.

(56) References Cited

U.S. PATENT DOCUMENTS

| | | |
|---|---|---|
| 4,853,884 A | 8/1989 | Brown et al. |
| 5,023,836 A | 6/1991 | Mori |
| 6,070,178 A | 5/2000 | Anderson et al. |
| 6,571,263 B1 | 5/2003 | Nagai |
| 6,609,139 B1 | 8/2003 | Dultz et al. |
| 6,986,056 B1 | 1/2006 | Dultz et al. |
| 9,465,582 B1 | 10/2016 | Whelan et al. |
| 10,042,609 B2 * | 8/2018 | Reulet ............... G06N 10/00 |
| 2001/0017569 A1 | 8/2001 | Hasegawa |
| 2001/0023423 A1 | 9/2001 | Marinet |
| 2002/0159590 A1 | 10/2002 | Ikeda |
| 2003/0090306 A1 | 5/2003 | Saito |
| 2003/0101031 A1 | 5/2003 | Denk |
| 2003/0219119 A1 | 11/2003 | Kocarev et al. |

(Continued)

OTHER PUBLICATIONS

Pierret, Robert, Advanced Semiconductor Fundamentals. Aug. 2002, Prentice-Hall, pp. 96-97.

*Primary Examiner* — Tan V Mai
(74) *Attorney, Agent, or Firm* — Ronald Krosky; Azza Jayaprakash

(57) ABSTRACT

Various embodiments are described that relate to random number generation. When a desire arises for a random number a circuit can be completed with a reverse biased semiconductor-junction element. When the circuit is completed an analog voltage spike can be produced that is random due to properties of the reverse biased semiconductor-junction element. This analog voltage spike can be converted into a digital value that serves as the random number. The digital value can be outputted and used as the random number.

20 Claims, 10 Drawing Sheets

(56) References Cited

U.S. PATENT DOCUMENTS

| | | |
|---|---|---|
| 2004/0267847 A1 | 12/2004 | Harper |
| 2005/0055392 A1 | 3/2005 | Saito |
| 2005/0071400 A1 | 3/2005 | Ribordy et al. |
| 2006/0010182 A1 | 1/2006 | Altepeter et al. |
| 2007/0127718 A1 | 6/2007 | Ribordy et al. |
| 2008/0037379 A1 | 2/2008 | Arawawa |
| 2008/0065710 A1 | 3/2008 | Fiorentino et al. |
| 2008/0149866 A1 | 6/2008 | DeShazer et al. |
| 2009/0157782 A1 | 6/2009 | Lin et al. |
| 2010/0109660 A1 | 5/2010 | Wang et al. |
| 2010/0174766 A1 | 7/2010 | Weeks et al. |
| 2012/0026784 A1 | 2/2012 | Kanai et al. |
| 2014/0022837 A1 | 1/2014 | Wang et al. |
| 2014/0067890 A1 | 3/2014 | Zhu et al. |
| 2015/0193207 A1 | 7/2015 | Pooser |
| 2016/0117149 A1 | 4/2016 | Caron et al. |
| 2016/0202954 A1 | 7/2016 | Manipatruni et al. |

\* cited by examiner

SEMICONDUCTOR-JUNCTION-DERIVED RANDOM NUMBER GENERATION WITH TRIGGERING MECHANISM

CROSS-REFERENCE

This application claims priority to and is a continuation of U.S. patent application Ser. No. 14/514,421 filed on Oct. 15, 2014. The entirety of U.S. patent application Ser. No. 14/514,421 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

Computer systems can employ pseudorandom numbers for a variety of applications. To gain these pseudorandom numbers, a seed number can be employed. The seed number can be provided to an algorithm that uses the seed number to produce the pseudorandom numbers. Since the seed number is known, resulting numbers are not actually random numbers, but instead are pseudorandom numbers. Therefore, if a party discovers the seed number, then security can be compromised.

SUMMARY

In one embodiment, a system comprises an activation component and an identification component. The activation component is to activate a circuit comprising a reverse biased semiconductor-junction element in response to a request for a randomly-generated number. The identification component is to identify a voltage for the reverse biased semiconductor-junction element, where the randomly-generated number is based, at least in part, on the voltage. The activation component, the identification component, or a combination thereof is implemented, at least in part, but way of non-software.

In another embodiment, a system comprises a measurement component and a generation component. The measurement component measures a voltage for a non-diode reverse biased semiconductor-junction element while the generation component generates a number based on the voltage for the non-diode reverse biased semiconductor-junction element. The number is outputted to a computer structure and the measurement component, the generation component, or a combination thereof is implemented, at least in part, by way of hardware.

In yet another embodiment, a system comprises a trigger component, a spike component, an analog to digital converter, and a number component. The trigger component is configured to trigger a circuit in a first instance in response to a first request for a first randomly-generated number, the circuit comprising a reverse biased semiconductor-junction element. The trigger component is also configured to trigger the circuit in a second instance in response to a second request for a second randomly-generated number. The spike component is configured to read a first voltage spike for the reverse biased semiconductor-junction element produced from triggering the circuit in the first instance and is also configured to read a second voltage spike for the reverse biased semiconductor-junction element produced from triggering the circuit in the second instance. The analog to digital converter is configured to convert the first voltage spike from a first analog input to a first floating point number output and is configured to convert the second voltage spike from a second analog input to a second floating point number output. The number component is configured to cause an output of the first floating point number output as the first randomly-generated number as well as cause an output of the second floating point number as the second randomly-generated number. The first instance and the second instance are independent instances and the first voltage spike and the second voltage spike have different values. The first floating point number output and the second floating point number output are non-identical and the first randomly-generated number and the second randomly-generated number are different numbers.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
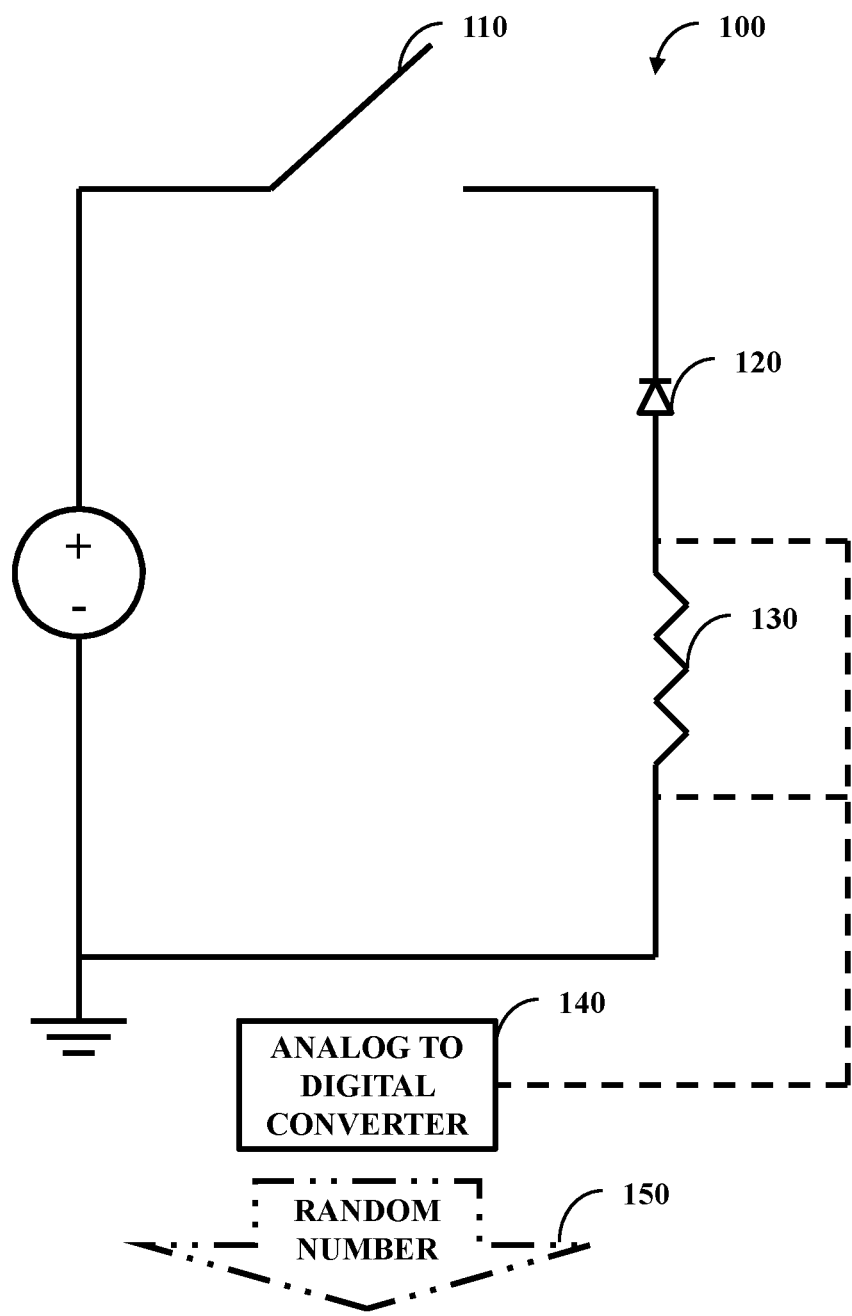
FIG. 1 illustrates one embodiment of a system comprising a switch, a reverse biased semiconductor-junction element, a resistor, and an analog digital converter.

In one embodiment, a reverse biased semiconductor-junction element can be used in generating a random number. To produce a truly random number, the number can be based on a voltage associated with the reverse biased semiconductor-junction element. Power can be supplied to the reverse biased semiconductor-junction element causing a voltage spike. This voltage spike can vary randomly due to physical characteristics of the reverse biased semiconductor-junction element and/or a bias voltage. This random voltage spike can be converted into a floating point number that is truly random.

This random number can be used in electronics and computing applications and aspects can be applied in probability, statistics, or numerical analysis. Example applications can include generation of data-encryption keys, simulation and modeling, random sample selection from large data sets, or gaming applications. In a more detailed example, the simulation can be wireless channel simulation (e.g., the random number is used for multiple iterations of a simulated loop) and/or simulation of white noise on a modeled electronic circuit or photonic system.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 2:
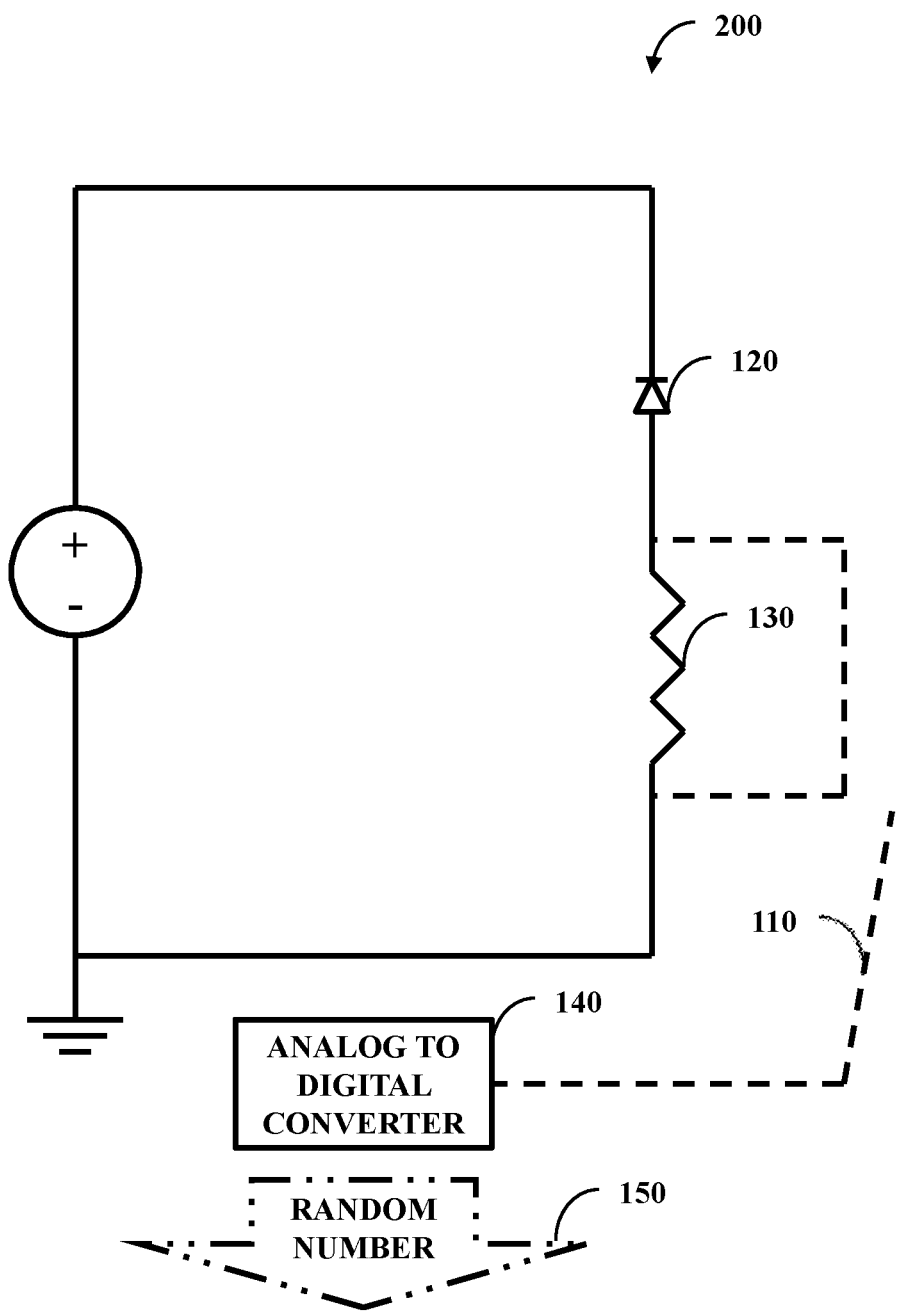
FIG. 2 illustrates one embodiment of a system comprising the switch, the reverse biased semiconductor-junction element, the resistor, and the analog digital converter.

FIGS. 1-2 illustrate two systems 100 and 200 that include a switch 110, a diode 120, a resistor 130, and an analog digital converter 140. While FIG. 1 illustrates the switch 110 being part of a circuit, FIG. 2 illustrates the switch 110 being part of a connector between the analog to digital converter 140 and the circuit. The switch 110 can be an example trigger to cause generation of a random number.

For the system 100, when the switch 110 closes the circuit can activate and as such the diode 120 becomes active. When the diode 120 becomes active, the diode 120 can release an analog voltage spike that can be measured off the resistor 130 by the analog to digital converter 140. The analog to digital converter 140 can convert this analog voltage spike to a floating point number. The floating point number can be outputted as a random number 150 (e.g., outputted to a personal computer by way of an interface, such as a universal serial bus, Ethernet connection, RS-232, etc.).

For the system 200, the random number 150 can be generated from an already active circuit. With the already active circuit the resistor 130 can have a voltage across itself produced from the diode 120. When the switch 110 connects, then the analog to digital converter 140 can access that voltage and use that voltage to produce the random number 150.

In one embodiment, multiple diode 120 and resistor 130 combinations can be put together in series or multiple independent circuits can be accessible by the analog to digital converter 140. The purpose of the diode 120 can be for random number generation and the diode can be appropriately biased such that random voltage values can be identified (e.g., observed). The analog to digital converter 140 can select which of the series combinations from which to read the voltage and/or which independent circuit to activate. The analog to digital converter 140 can make these selections psuedorandomly based off a seed number, thus including a level of psuedorandomness to the already random number. Therefore, a further level of complexity can be given to the random number 150 that makes the random number that much harder to decrypt.

Figure 3:
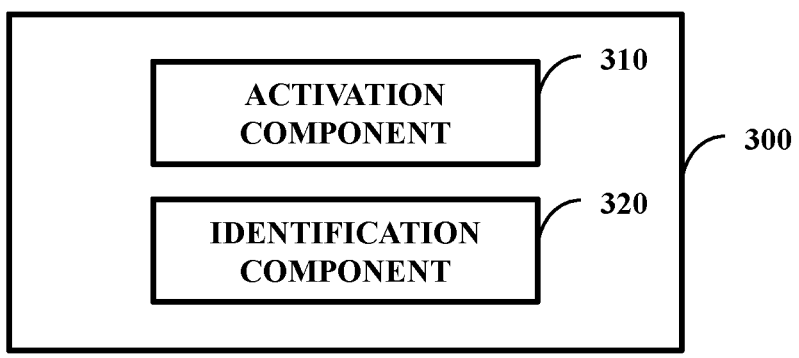
FIG. 3 illustrates one embodiment of a system comprising an activation component and an identification component.

FIG. 3 illustrates one embodiment of a system 300 comprising an activation component 310 and an identification component 320. The activation component 310 is to activate a circuit comprising a reverse biased semiconductor-junction element (e.g., the diode 120 of FIGS. 1-2 (e.g., a Zener diode), a NPN transistor, a PNP transistor, etc.). This activation can be in response to a request for a randomly-generated number (e.g., a request for the random number 150 of FIGS. 1-2). Example requests can be provided by a computer program or by a manual request of a user (e.g., a user pressing a button). The request can be produced from outside the system 300 or outside of a housing that retains the system 100 of FIG. 1, the system 200 of FIG. 2, or the system 300 of FIG. 3. Doing the activation in response to the request allows for production of the randomly-generated number on demand.

The identification component 320 is to identify a voltage for the reverse biased semiconductor-junction element, where the randomly-generated number is based, at least in part, on the voltage. Identification of the voltage can be reading the voltage off the resistor 130 of FIGS. 1-2. The activation component 310, the identification component 320, or a combination thereof can be implemented, at least in part, but way of non-software (e.g., hardware). In one example of non-software implementation, the activation component 310 can be the switch 110 of FIGS. 1-2 and the identification component 320 can be a voltmeter. In one embodiment, when the circuit is activated a voltage comes across the resistor 130 of FIG. 1. This voltage corresponds to the voltage for the reverse biased semiconductor-junction element and identifying the voltage can comprise measuring the voltage across the resistor 130 of FIG. 1 once the circuit is activated.

In one embodiment, before the activation component 310 activates the circuit, the circuit can be non-functional (e.g., the circuit is not completed and thus the diode 120 of FIG. 1 does not function). Once the activation component 310 activates the circuit, the circuit can be functional (e.g., the circuit is completed and thus the diode 120 of FIG. 1 produces the analog voltage spike). Once the voltage is measured the circuit can return to non-functional (e.g., the circuit can return to a non-completed state and thus the diode 120 of FIG. 1 does not function). In view of this, inherent in the request can be a request for the circuit to be activated.

In one embodiment, the request designates a future time for production of the randomly-generated number and the circuit is activated at the future time (e.g., by the activation component 310). In one example, the request is part of a computer program. The computer program can have various commands that occur in sequence. The third command can be a command for production of the randomly-generated number. Thus, the future time is a time not in a first command of the computer program. When the second command completes, then the third command can function and as such the randomly-generated number can be produced.

In one embodiment, activation of the circuit comprises powering the circuit such that a threshold voltage is met for the reverse biased semiconductor-junction element. In response to the threshold voltage being met, the reverse biased semiconductor-junction element can produce the voltage non-uniformly. In this non-uniformity, the voltage (e.g., analog voltage spike) can vary from one activation to the next activation.

Figure 4:
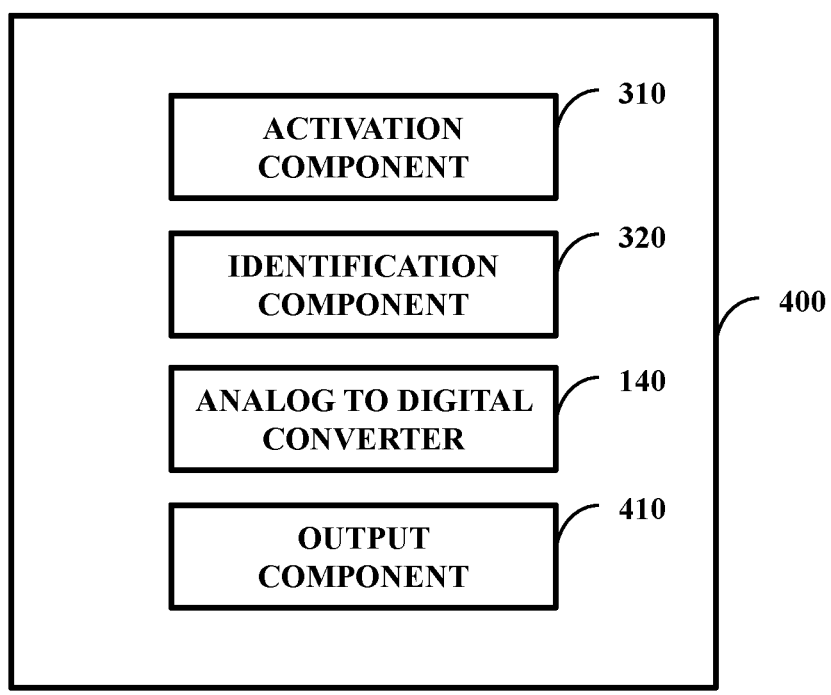
FIG. 4 illustrates one embodiment of a system comprising the activation component, the identification component, the analog to digital converter, and an output component.

FIG. 4 illustrates one embodiment of a system 400 comprising the activation component 310, the identification component 320, the analog to digital converter 140, and an output component 410. The analog to digital converter 140 is to convert the voltage for the reverse biased semiconductor-junction element (analog input) to the randomly-generated number (digital output). The output component 410 is to output the randomly generated number to an external structure (e.g., wirelessly to a computer and presented on a user's computer interface). The circuit can be activated in response to an event external to the system and external to the circuit, such as an event that occurs at the external structure.

The system 400 (as well as the system 300 of FIG. 3) can incorporate the circuit itself such that the system 100 of FIG. 1 and/or the system 200 of FIG. 2 can be included. Furthermore, the analog to digital converter 140 can incorporate the output component 410, the activation component 310, the identification component 320, or a combination thereof (e.g., analog to digital converter 140 outputs digital data to the external system and thus functions as the output component 410). A housing can retain the system 400. The system 400 (e.g., with the circuit discussed above) can be added to a structure (e.g., computer system) and various applications can use the system 400 to produce random numbers.

Figure 5:
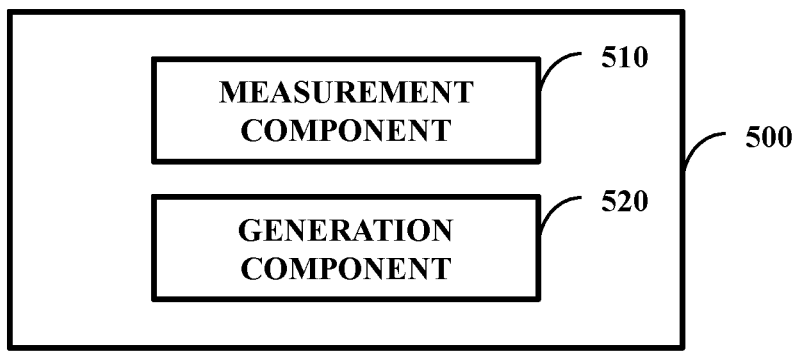
FIG. 5 illustrates one embodiment of a system comprising a measurement component and a generation component.

FIG. 5 illustrates one embodiment of a system 500 comprising a measurement component 510 and a generation component 520. The measurement component 510 can measure a voltage for a reverse biased semiconductor-junction element. The reverse biased semiconductor-junction element can be a diode or a non-diode element (e.g. NPN transistor or a PNP transistor).

The generation component 520 can generate a number based on the voltage for the reverse biased semiconductor-junction element. The number can be outputted to a computer structure (e.g., to an external computer structure). In one example, the generation component 520 outputs the number upon generation of the number. The measurement component 510, the generation component 520, or a combination thereof can be implemented, at least in part, by way of hardware (e.g., the system 500 comprises a voltmeter that functions as the measurement component 510, the generation component 520, or a combination thereof).

In one embodiment, the voltage measured by the measurement component 510 is produced from transmission of wireless power. Therefore, the measurement component 510 can measure a voltage of wireless power transmitted. In this embodiment, a circuit that includes the reverse biased semiconductor-junction element can include a wireless power transmitter.

In one embodiment, the circuit that includes the reverse biased semiconductor-junction element can include a resistor across which the measurement component 510 measures the voltage. Prior to generation of the number the circuit can be non-functional (e.g., the circuit of FIG. 1 where the switch 110 is open) while after generation of the number the circuit can be functional (e.g., the circuit of FIG. 1 where the switch 110 is closed). Once the number is generated the circuit can again become non-functional (e.g., the circuit of FIG. 1 where the switch 110 is open) until another number is to be generated. A configuration can also be where prior to generation of the number the circuit can be functional (e.g., the circuit of FIG. 2 where the switch 110 is closed) while after generation of the number the circuit can be functional (e.g., the circuit of FIG. 2 where the switch 110 is closed).

Figure 6:
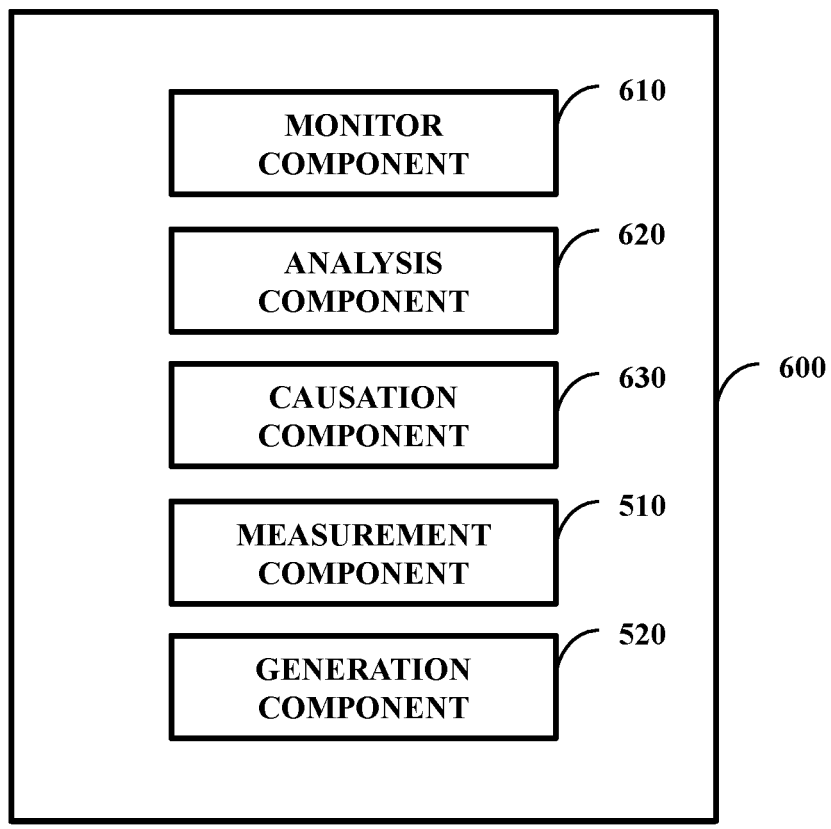
FIG. 6 illustrates one embodiment of a system comprising a monitor component, an analysis component, a causation component, the measurement component, and the generation component.

FIG. 6 illustrates one embodiment of a system 600 comprising a monitor component 610, an analysis component 620, a causation component 630, the measurement component 510, and the generation component 520. The monitor component 610 can monitor an event external to a circuit that comprises the reverse biased semiconductor-junction element to produce a monitor result. Example external events can include a point in a timing sequence or a microcontroller interrupt. The analysis component 620 can analyze the monitor result to produce an analysis result. The causation component 630 can cause the voltage to be available in response to the analysis result being that the voltage should be available.

In one example, the monitor component 610 can monitor functioning of a microcontroller (e.g., identify when the microcontroller is not-interrupted and when there is a microcontroller interrupt). This monitoring can result in a stream of samples, such as a sample taken every $100^{th}$ of a second. If the microcontroller is not in interrupt, then the result can be 0 while if the microcontroller has an interrupt, then the result can be 1. The analysis component 620 can analyze this result to identify when a 1 is present. When a 1 is present, the causation component 630 can cause the switch 110 of FIG. 1 to close and as such cause an analog voltage to go across the resistor 130 of FIG. 1. The measurement component 510 can measure the analog voltage and the generation component 520 can generate a random number by converting the analog voltage to a digital floating point number. Therefore, when an event occurs (e.g., the microcontroller experiences an interrupt) a random-based digital floating point number can be produced.

In one embodiment, the event can be a command of a computer program. In one example, the event is a non-first-in-time command of the computer program. The computer program can be configured to proactively implement a series of commands (e.g., two or more commands) that comprises the non-first-in-time command. Proactive implementation can be that the computer program can on its own run the second command after the first command.

Figure 7:
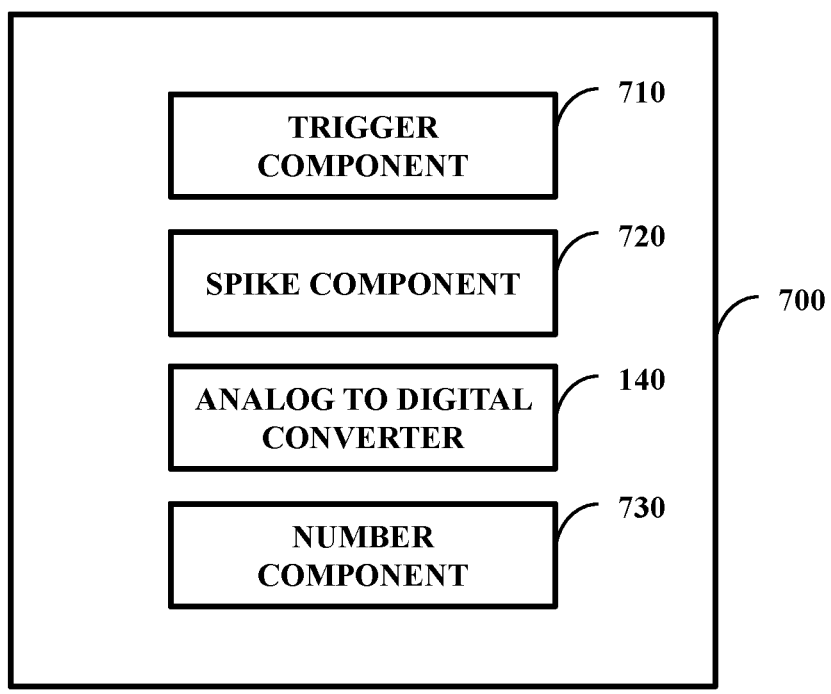
FIG. 7 illustrates one embodiment of a system comprising a trigger component, a spike component, the analog to digital converter, and a number component.

FIG. 7 illustrates one embodiment of a system 700 comprising a trigger component 710, a spike component 720, the analog to digital converter 140, and a number component 730. The trigger component 710 can be configured to receive a first request for a first randomly-generated number and in response to this request trigger, in a first instance, a circuit comprising a reverse biased semiconductor-junction element. The spike component 720 can be configured to read a first voltage spike for the reverse biased semiconductor-junction element produced from triggering of the circuit in the first instance. The analog to digital converter 140 can be configured to convert the first voltage spike from a first analog input to a first floating point number output. The number component 730 can be configured to cause an output of the first floating point number output as the first randomly-generated number. In short, the system 700 can function in a first instance to produce the first randomly-generated number.

Similarly, the system 700 can function in a second instance. The first instance and the second instance can be independent instances such that they occur at different points in time. The trigger component 710 can trigger the circuit in the second instance in response to a second request for a second randomly-generated number. In one embodiment, at least one of the first request, the second request, or a combination thereof is a manual request (e.g., a user presses a button and in response to this button being pressed the trigger component 710 causes the switch 110 of FIG. 1 to close and complete the circuit). The first request and second request can be sub-requests of a larger request (e.g., the larger request including the first request for a random number at time x and the second request for a random number at time y with x and y being different) or be independent requests.

The spike component 720 can read a second voltage spike for the reverse biased semiconductor-junction element that is produced from triggering of the circuit in the second instance. Typically, the first voltage spike and the second voltage spike can have different values. However, it may be possible for the first voltage spike and the second voltage spike to have the same value by random chance that the reverse biased semiconductor-junction element has similar functionality when being powered two times despite the randomness of the reverse biased semiconductor-junction element. In one embodiment, at least one of the first voltage spike, the second voltage spike, or a combination thereof result from transmission of wireless energy.

The analog to digital converter 140 can convert the second voltage spike from a second analog input to a second floating point number output. The number component 730 can cause an output of the second floating point number as the second randomly-generated number. The first floating point number output and the second floating point number output can be non-identical and the first randomly-generated number and the second randomly-generated number can be different numbers. However, as discussed in the previous paragraph, it may be possible for the first floating point number output and the second floating point number output to be identical and the first randomly-generated number and the second randomly-generated number to be non-different in an off chance that the first voltage spike and the second voltage spike match.

In one embodiment, a computer program can be used to produce these randomly-generated numbers. The trigger component 710 can trigger the circuit in the first instance in response to a computer program sending a command as the first request at a first point in time. The trigger component 710 can also trigger the circuit the second instance in response to the computer program sending the command as the second request at a second point in time. The first point in time can be different from the second point in time and therefore the same computer program can cause generation of random numbers at different times.

In one embodiment, the trigger component 710 can trigger the circuit in the first instance in response to a first computer program sending a first instruction as the first request. The trigger component 710 can also trigger the circuit in the second instance in response to a second computer program sending a second instruction as the second request. The first computer program and the second computer program can be different computer programs (e.g., different copies of the same program or completely different programs).

In one embodiment, the system 700 functions in conjunction with the system 100 of FIG. 1. Before the trigger component 710 triggers from the first instance, the circuit can be non-functioning (e.g., the switch 110 of FIG. 1 is open). After the trigger component 710 triggers from the first instance, the circuit can be functional (e.g., the switch 110 of FIG. 1 is closed). The circuit can be non-functional after the reading of the first voltage spike by the spike component (e.g., the switch 110 of FIG. 1 is open). This return to non-functionality can be directly after reading, after conversion, etc. The circuit can be non-functional before the triggering by the trigger component 710 from the second instance and functional after the triggering by the trigger component 710 from the second instance.

Figure 8:
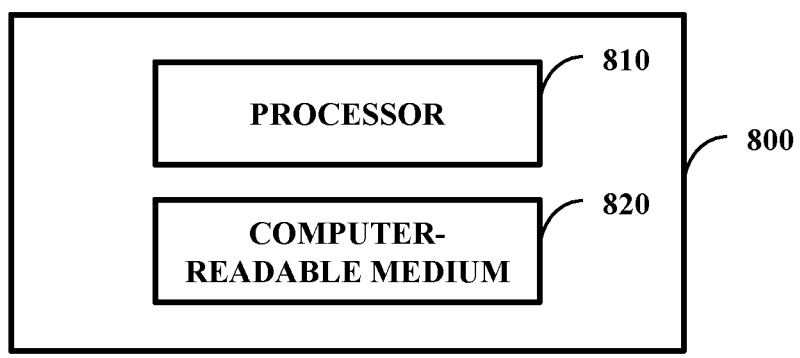
FIG. 8 illustrates one embodiment of a system comprising a processor and a computer-readable medium.

FIG. 8 illustrates one embodiment of a system 800 comprising a processor 810 and a computer-readable medium 820 (e.g., non-transitory computer-readable medium). In one embodiment, the computer-readable medium 820 is communicatively coupled to the processor 810 and stores a command set executable by the processor 810 to facilitate operation of at least one component disclosed herein (e.g., the activation component 310 of FIG. 3, the identification component 320 of FIG. 3, etc.) or the analog to digital converter 140 of FIG. 1. In one embodiment, at least one component disclosed herein (e.g., the measurement component 510 of FIG. 5, the generation component 520 of FIG. 5, etc.) as well as the analog to digital converter 140 of FIG. 1 can be implemented, at least in part, by way of non-software, such as implemented as hardware by way of the system 800. In one embodiment, the computer-readable medium 820 is configured to store processor-executable instructions that when executed by the processor 810 cause the processor 810 to perform a method disclosed herein (e.g., the methods 900-1000 addressed below).

Figure 9:
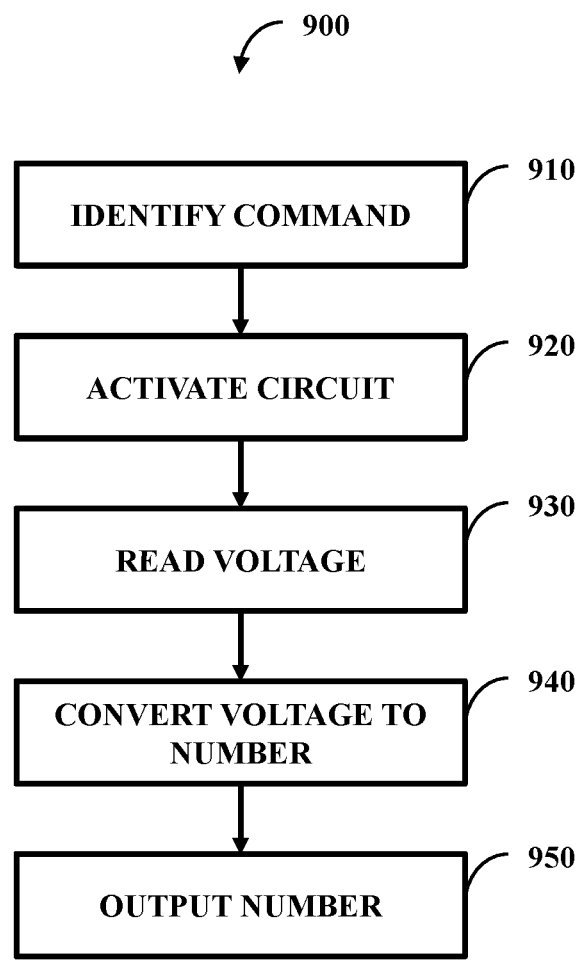
FIG. 9 illustrates one embodiment of a method comprising five actions.

FIG. 9 illustrates one embodiment of a method 900 comprising five actions 910-950. A command for generation of a random number can be identified at 910, such as being collected and read. A check can be performed on if a reverse biased semiconductor-junction element is in a condition to produce an analog voltage spike. If the element is not in such a condition, then an error message can be outputted or a system running the method 900 can wait until the condition is met. If the condition is met or if no check is performed then the circuit can be activated at 920. With this activation a voltage can go across the resistor 130 of FIG. 1 and the voltage can be read at 930. This voltage can be analog and to become the randomly generated number the voltage can be converted to a digital output at 940 and then outputted at 950.

Figure 10:
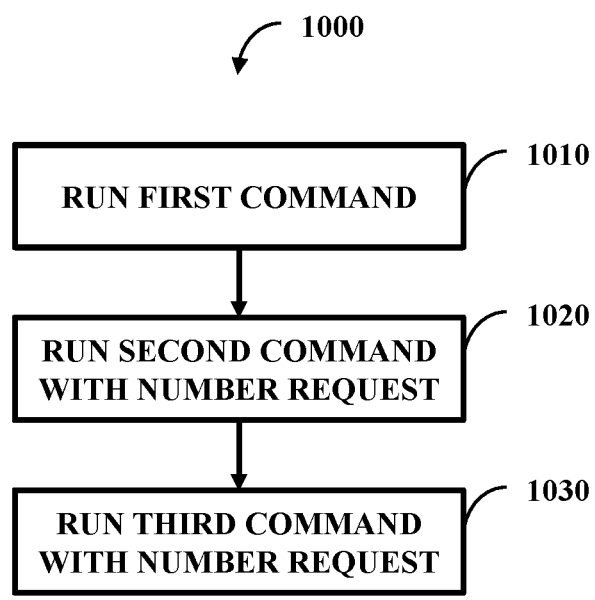
FIG. 10 illustrates one embodiment of a method comprising three actions.

FIG. 10 illustrates one embodiment of a method 1000 comprising three actions 1010-1030. These actions 1010-1030 can be how a computer program operates. At 1010 the computer program can run a first command that does not involve requesting a random number. The computer program can then run a second command (e.g., subsequent to the first command) that includes a request for the random number. In response to this request from the second command the random number can be generated. Therefore, the number can be provided when desired and the computer program can request on its own when desired. The computer program can run a third command at 1030 and this can be a separate number request although a computer program can implement with one number request. Thus, multiple random numbers can be produced from one computer program and the numbers produced can be independent of one another in that they are produced from physical characteristics of the reverse biased semiconductor-junction element.

What is claimed is:

1. A system, comprising:
a measurement component that measures a voltage for an electrical hardware element;
a generation component that generates a number based on the voltage;
a monitor component that monitors an event external to a circuit to produce a monitor result, the circuit comprises the electrical hardware element;
an analysis component that analyzes the monitor result to produce an analysis result; and
a causation component that causes the voltage to be available in response to the analysis result being that the voltage should be available,
where the number is outputted to a computer structure and
where the measurement component, the generation component, or a combination thereof is implemented, at least in part, by way of hardware.

2. The system of claim 1, where the voltage is produced from transmission of wireless power.

3. The system of claim 1,
where a circuit comprises the electrical hardware element and a resistor,
where the voltage is measured from across the resistor,
where the circuit is non-functional prior to generation of the number, and
where the circuit is functional for generation of the number.

4. The system of claim 1, where the event is a command of a computer program.

5. The system of claim 4, where the event is a non-first-in-time command of the computer program when the computer program proactively implements a series of commands that comprises the non-first-in-time command.

6. The system of claim 3, where the electrical hardware element is a diode.

7. The system of claim 3, where the electrical hardware element is a transistor.

8. The system of claim 3, where after the generation of the number, the circuit is non-functional again.

9. The system of claim 1, where the event external to the circuit is a timing sequence event.

10. The system of claim 1, where the event external to the circuit is an interrupt of a microcontroller.

11. The system of claim 1, where the generation component generates the number by conversion of the voltage, which is an analog voltage, to a digital floating point number.

12. A system, comprising:
a trigger component configured to trigger a circuit to produce a voltage spike in response to a request for a randomly-generated number;
a spike component configured to read the voltage spike;
an analog to digital converter configured to convert the voltage spike from an analog input to a floating point number output; and
a number component configured to cause an output of the floating point number output as the randomly-generated number.

13. The system of claim 12, where the circuit is triggered in response to a computer program sending an instruction as the request.

14. The system of claim 12, where the request is a manual request.

15. The system of claim 12, where the voltage spike results from transmission of wireless energy.

16. The system of claim 12,
where the circuit is non-functional before the triggering from the instance,
where the circuit is functional after the triggering from the instance, and
where the circuit is non-functional after the reading of the voltage spike.

17. The system of claim 12,
where the circuit comprises a reverse biased semiconductor-junction element and
where the voltage spike is a spike of the reverse biased semiconductor-junction element.

18. The system of claim 17, where the reverse biased semiconductor-junction element is a diode.

19. The system of claim 17, where the reverse biased semiconductor-junction element is a NPN transistor.

20. The system of claim 17, where the reverse biased semiconductor-junction element is a PNP transistor.

* * * * *